United States Patent [19]
Wang

[11] Patent Number: 5,856,619
[45] Date of Patent: Jan. 5, 1999

[54] TIRE PRESSURE INDICATOR

[76] Inventor: Kuo-Tsai Wang, No.2 Alley 41 Lane 54, Nan Tai Street, Yung Kang City, Tainan Hsuan, Taiwan

[21] Appl. No.: 855,168

[22] Filed: May 13, 1997

[51] Int. Cl.[6] ........................... A06F 73/146; A06F 73/80
[52] U.S. Cl. ........................ 73/146.5; 116/34 R; 340/442
[58] Field of Search ............................... 73/146.2, 146.5, 73/146.8; 116/34 R; 340/442

[56]  References Cited

U.S. PATENT DOCUMENTS

| | | | |
|---|---|---|---|
| 4,601,254 | 7/1986 | Huang et al. | 116/34 R |
| 4,945,337 | 7/1990 | Huang | 340/442 |
| 5,025,244 | 6/1991 | Huang | 340/442 |
| 5,604,481 | 2/1997 | Lin | 73/146.8 X |

FOREIGN PATENT DOCUMENTS 926592   4/1955   Germany .

Primary Examiner—George M. Dombroske
Assistant Examiner—Paul D. Amrozowicz

[57]  ABSTRACT

A tire pressure indicator includes a cylindrical connecter, a lamp cover combined with the connecter, and an electric conducting unit arranged in the lamp cover. The connecter has an air guide disc to press open an air valve of a tire to let air in the tire flow out into the connecter, If the air pressure in the tire is sufficient, a bellows in the connecter expands inward to push an inverted T-shaped disc inward, which then pushes inward a battery laterally put in an insulating ring so that the negative of the battery disconnected from a negative washer fitted on the inverted T-shaped disc, turning off an LED lamp fixed in the lamp cover. If the air pressure in the tire is insufficient, the bellows shrinks back, permitting the battery move back by elasticity of a spring and contact with the negative washer as to turn on the lamp.

1 Claim, 3 Drawing Sheets

TIRE PRESSURE INDICATOR

BACKGROUND OF THE INVENTION

This invention concerns a tire pressure indicator, particularly able to connect with an air valve of a tire for indicating low pressure of the air in a tire by a lamp turned on in that case.

The pressure of a tire is generally inspected by a driver by viewing the condition of the tire or tested with a pressure gauge.

SUMMARY OF THE INVENTION

The purpose of the invention is to offer a tire pressure indicator with a simple structure and able to indicate it with an LED lamp turned on if the air pressure of a tire is not enough.

The main feature of the tire pressure indicator is bellows provided a cylindrical connecter able to screw with an air valve of a tire to let the air flow out of the valve to expand the bellows to push a battery in case of the air in the tire being enough. The battery is then moved inward to be disconnected from a negative washer to cut off the current of the battery and a liton LED lamp. It the air pressure in the tire is not sufficient, then the battery is moved back by a spring recovering elasticity, contacting the negative washer to light up the LED lamp, and showing that the air pressure in the tire is not enough.

BRIEF DESCRIPTION OF DRAWINGS

This invention will be better understood by referring to the accompanying drawings, wherein.

DESCRIPTION OF THE PREFERRED EMBODIMENT

Figure 1:
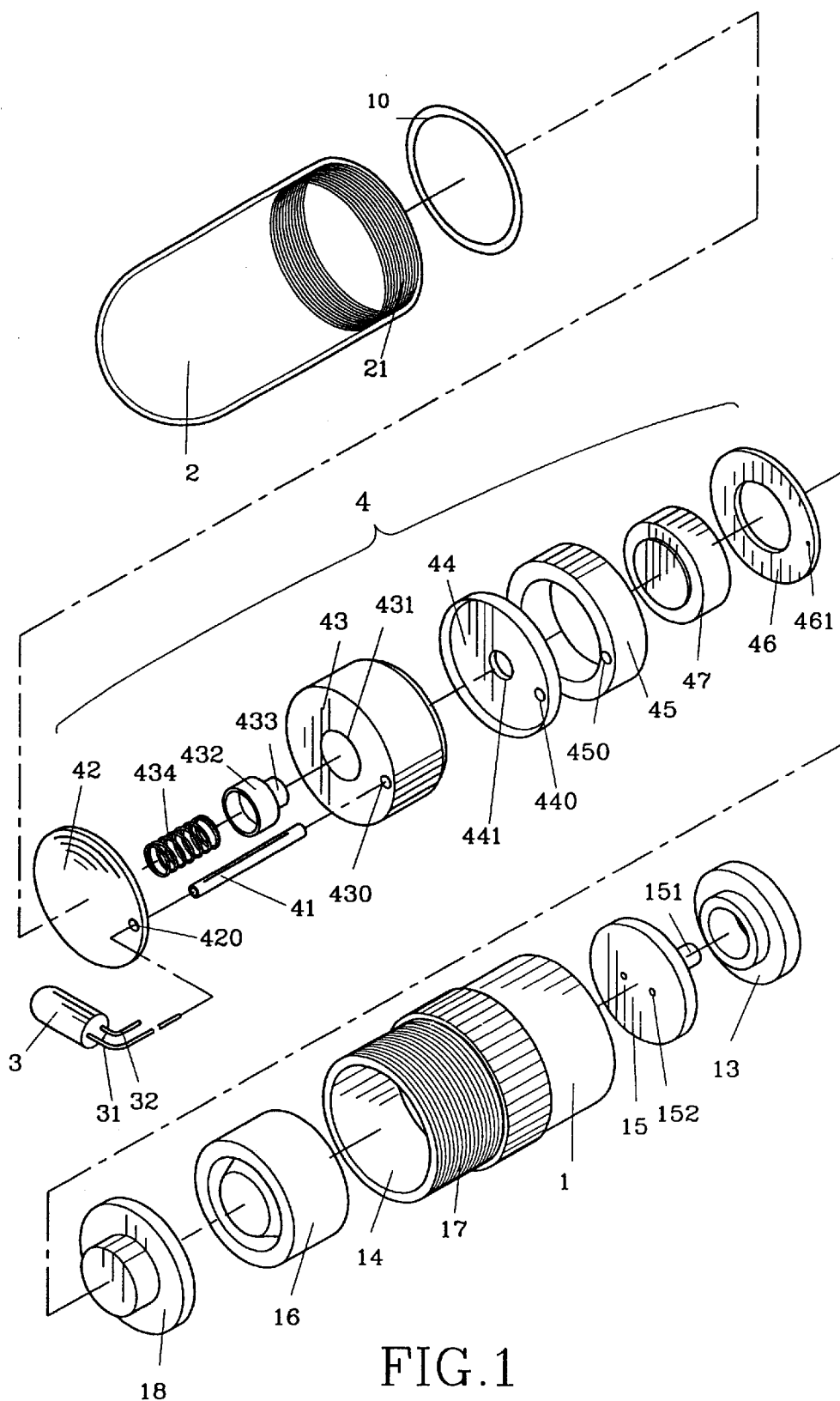
FIG. 1 is an exploded perspective view of a preferred embodiment of a tire pressure indicator in the present invention.
Figure 2:
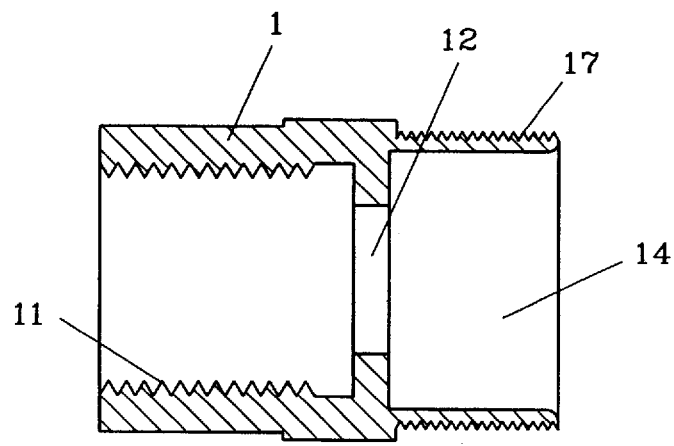
FIG. 2 is a cross sectional view of the preferred embodiment of a connecter of the tire pressure indicator in the present invention.

A preferred embodiment of a tire pressure indicator in the present invention, as shown in FIG. 1, includes a connecter 1 and a lamp cover 2, an LED lamp 3, and an electric conducting unit 4 as main components combined together.

The connecter 1 is shaped cylindrical, having an H-shaped cross-section, an intermediate small diameter hole 12, a front portion with female threads 11 able to screw with male threads of an air valve of a tire, a rear portion with male threads 17 and a center hole 14.

An air guide disc 15 and a seal gasket 13 are together fitted in the intermediate hole 12 for opening the air valve of a tire. A shrinkable bellows 16 and an inverted T-shaped disc 18 are together fitted in the a center hole of the rear portion of the connecter 1. The air guide disc 15 has a projecting-down post 151, two air holes 152, 152 at two sides of the post 151 so that the post 151 may press the air valve of a tire so as to permit air in the tire flow out through the two air holes 152 into the connecter and to the shrinkable bellows 16.

The lamp cover 2 receives an LED lamp 3 and an electric conducting unit 4 therein, having female threads 21 in a lower end to screw with the male threads 17 of the connecter 1 so as to assemble the lamp cover with the connecter 1 together.

The electric conducting unit 4 includes a negative pole tube 41, a positive conductor 42, an insulating spring base 43 having a center hole 431, a fix disc 44 having a center hole 441, an insulating ring 45, a negative copper washer 46 having a center hole 461, a battery 47 laterally placed in the insulating ring 45. The positive copper washer 42, the insulating spring base 43, the fix disc 44, the insulating ring 45 all have a hole 420, 430, 440, 450 near a spherical edge at the same location for the negative tube 45 to extend therein to secure those components 42, 43, 44 and 45 in place. Then, a negative lead 31 of the LED lamp 3 is inserted in the negative pole tube 41 and connected with the negative copper washer 46, and the positive copper conductor 42 is connected with the positive lead 32. Then, a T-shaped copper cylinder 432 having a lower small diameter portion 433, and a spring 434 are orderly inserted in the center hole 431 of the insulating spring base 43, with the lower small diameter portion 433 protruding through the center hole 441 of the fix disc 44 to urge the positive of the battery 47, and with the spring 434 urged by the positive copper conductor 42 securely in place.

Figure 3:
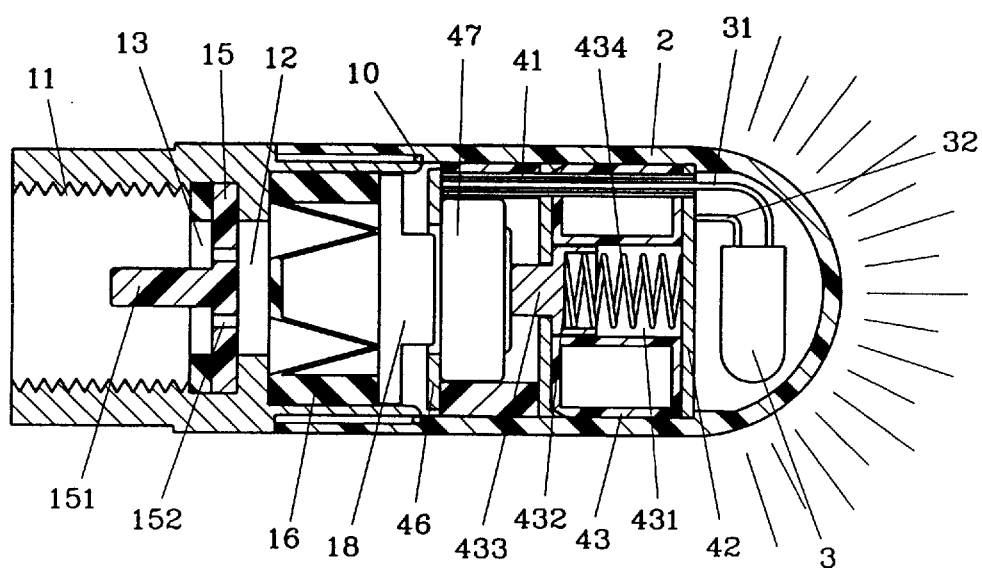
FIG. 3 is a cross-sectional view of the preferred embodiment of a tire pressure indicator in the present invention, showing a lamp in a lit condition; and, FIG. 4 is a cross-sectional view of the preferred embodiment of a tire pressure indicator in the present invention, showing the lamp in a turned-off condition.
Figure 4:
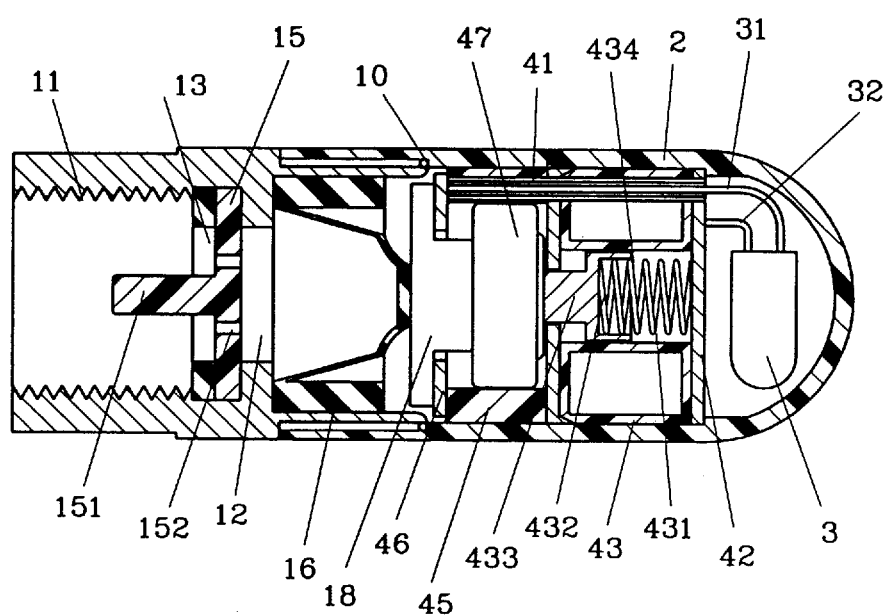

In using this tire pressure indicator, referring to FIGS. 3 and 4, the connecter 1 is made to screw with an air valve of a tire, with the air guide disc 15 guiding the air coming out of the tire to flow through the air holes 152 into the connecter 1 to the extensible bellows 16. If the air pressure of the tire is strong enough, the shrinkable bellows 16 is expanded inward by the air, pushing the T-shaped disc 18, which has the projecting portion protruding the center hole 461 of the negative copper washer 46 to push the battery 47 inward. Then the T-shaped copper cylinder 432 is pushed inward to compress the spring 43 to the positive copper conductor 42. Consequently, the negative of the battery 47 does not contact with the negative washer 46, with the negative cut off and with the LED lamp unable to light up.

In case the air pressure of a tire is not sufficient, the shrinkable bellows 16 shrinks back so that the spring 434 recovers its elasticity to extend inward, forcing the projecting portion 433 of the copper cylinder 432 push forward the battery 47 and the inverted T-shaped disc 18 back. Then the battery 47 moves inward to let its negative contact with the negative washer 46, permitting thn negative get through to light up the LED lamp 3.

Whille the preferred embodiment of the invention has been described above, it will be recognized and understood that various modifications may be made therein and the appended claims are intended to cover all such modifications which may fall within the spirit and scope of the invention.

What is claimed is:

1. A tire pressure indicator comprising:
   a connecter shaped cylindrical, and having a center lengthwise space of an H-shaped cross-section, an outer portion having female threads to screw with male threads of an air valve of a tire, an air guide disc together with a seal gasket fitted in an intermediate portion and in said outer portion, said intermediate portion having a smaller diameter hole than those said outer portion and an inner portion have, said inner portion having male threads, an extensible bellows fixed in said inner portion, an inverted T-shaped disc located behind said bellows in said inner portion, said male threads screwing with female threads of a lamp-cover via a washer;

said air guide disc having a center projecting-down post and two air holes at both sides of said post, said post able to press open the air valve of a tire inward to let air in the tire to flow out to pass through said two air holes into said connecter to extend said extensible bellows;

said lamp cover receiving an LED lamp and an electric conducting unit therein, having female threads in a lower end to screw with said male threads of said connecter;

said electric conducting unit including a negative pole tube, a positive copper conductor, an insulating spring base with a center hole, a fix disc with a center hole, an insulating ring, and a negative copper washer with a center hole; a battery deposited laterally in said insulating ring, said positive copper conductor, said insulating spring base, said fix disc and said insulating ring all having a hole near a spherical edge in the same location for fitting said negative pole tube therein in place, said negative pole tube containing a negative lead coming from said LED lamp and connected with said negative washer, said positive copper conductor connected with said positive of said LED with a positive lead, said center hole of said insulating spring base receiving a small diameter portion of a copper cylinder and a spring therein, said projecting small diameter portion protruding through the center hole of said fix disc and urging the positive of said battery, said spring urged in place by said positive copper disc; and, said connecter screwed with and pressing an air valve of a tire for forcing air of the tire to flow out, said extensible bellows expanded inward to push said inverted T-shaped disc when the air pressure of the tire is strong enough, said inverted T-shaped disc then pressing said battery in said insulating ring, said battery pressed to move inward to be disconnected from said negative washer so that the negative of said battery is cut off and said LED lamp is then turned off, said bellows shrinking back in case the air pressure of the tire is not sufficient for running, said spring compressed so far recovering its elasticity to push said T-shaped cylinder back, which then pushes said battery back to contact with said negative washer so that said LED lamp is lit up to show that the air pressure in the tire is not sufficient for running.

\* \* \* \* \*